United States Patent [19]

Gouch

[11] Patent Number: 5,907,153

[45] Date of Patent: May 25, 1999

[54] RADIATION BEAM SCANNING APPARATUS AND METHOD EMPLOYING DISTORTION COMPENSATION

[75] Inventor: Martin Philip Gouch, Herts, United Kingdom

[73] Assignee: Fujifilm Electronic Imaging Ltd., London, United Kingdom

[21] Appl. No.: 08/982,444

[22] Filed: Dec. 2, 1997

[30] Foreign Application Priority Data

Dec. 9, 1996 [GB] United Kingdom ............ 9625512

[51] Int. Cl.⁶ .................................................. G02B 26/00
[52] U.S. Cl. ........................................ 250/236; 359/197
[58] Field of Search .................................. 250/236, 230, 250/234, 235, 229; 347/237; 359/197, 209; 369/112

[56] References Cited

U.S. PATENT DOCUMENTS

| | | | |
|---|---|---|---|
| 5,281,812 | 1/1994 | Lee et al. ............................. | 250/235 |
| 5,461,601 | 10/1995 | Shinada et al. ....................... | 369/112 |
| 5,505,807 | 4/1996 | Min et al. ............................. | 156/230 |
| 5,532,730 | 7/1996 | Akanabe .............................. | 347/259 |

FOREIGN PATENT DOCUMENTS

0580080 A1  1/1994  European Pat. Off. .
0718658 A1  6/1996  European Pat. Off. .

*Primary Examiner*—Edward P. Westin
*Assistant Examiner*—Thanh X. Luu
*Attorney, Agent, or Firm*—Sughrue, Mion, Zinn, Macpeak & Seas, PLLC

[57] ABSTRACT

Radiation beam scanning apparatus comprises a rotatable reflector for causing an incident radiation beam to undergo a scanning movement; and a compensating device on to which the radiation beam impinges before reaching the rotating reflector. The compensating device modifies the optical path of circumferentially spaced portions of the beam upstream of the reflector, in phase with the rotation of the reflector, so as to compensate for distortions in the reflected beam introduced by the reflector.

8 Claims, 1 Drawing Sheet

RADIATION BEAM SCANNING APPARATUS AND METHOD EMPLOYING DISTORTION COMPENSATION

FIELD OF THE INVENTION

The invention relates to a method of scanning a radiation beam in which the beam impinges on a rotating reflector to cause the scanning movement and a method of performing such scanning.

DESCRIPTION OF THE PRIOR ART

Radiation beam scanning is used in several different applications for recording information (in which the beam is modulated) and for detecting information. We are particularly concerned with recording scanners in which a modulated radiation beam impinges on a record medium to record an image. Examples are the Crosfield Celix 4000, 2000 and 8000 scanners. These scanners operate at such a high resolution that it is important that the radiation beam spot on the record medium suffers minimal degradation due to the components in the optical path. One of the major sources of spot degradation is the rotating reflector or spinner, the distortions arising due to the spinning motion of the reflector. The problem with compensating for these distortions is that they rotate with the reflector. At present, in order to minimise this effect, the remainder of the optical system is manufactured to a much higher precision than necessary to ensure that at least the rest of the optical system does not contribute to spot degradation.

SUMMARY OF THE INVENTION

In accordance with one aspect of the present invention, a method of scanning a radiation beam in which the beam impinges on a rotating reflector to cause the scanning movement comprises modifying the optical path of circumferentially spaced portions of the beam upstream of the reflector, in phase with rotation of the reflector so as to compensate for distortions in the reflected beam introduced by the reflector.

In accordance with a second aspect of the present invention, radiation beam scanning apparatus comprises a rotatable reflector for causing an incident radiation beam to undergo a scanning movement; and a compensating device on to which the radiation beam impinges before reaching the rotating reflector, the compensating device modifying the optical path of circumferentially spaced portions of the beam upstream of the reflector, in phase with the rotation of the reflector, so as to compensate for distortions in the reflected beam introduced by the reflector.

With this invention, the beam is premodified around its circumference with a compensating distortion so as to minimise and even eliminate the distortion introduced by rotation of the reflector. The form of the distortion can be determined by observing the beam after reflection by the reflector and noting variations in wavefronts and then using this to control the type of modifications applied.

The compensating device could be a transmissive device in which the beam passes through the compensating device, different parts of the compensating device having different optical properties so as to modify the optical path length through the device for circumferentially spaced portions of the beam. For example, the device could be formed by a set of refractive elements whose index of refraction can be modified electronically.

In the preferred approach, however, the compensating device comprises an array of reflectors onto respective ones of which the circumferentially spaced portions of the beam impinge. Typically, 4–64 reflectors are provided, preferably 12–16. The use of reflectors is particularly convenient since in the preferred example, each reflector in the array can be physically distorted to modify its reflection characteristic. This distortion could be carried out using an array of control elements, for example a piezo-electric device or devices.

Preferably, a single, continuous reflector is provided mounted to an array of individual control elements although separate reflectors could be used.

The compensating device could rotate in phase with the rotating reflector but this complicates the construction of the apparatus. Preferably, therefore, the compensating device is rotationally static and further comprises a controller for controlling individual optical elements of the compensating device so as to cause the modifications imparted by the optical elements to rotate with the reflector. With this arrangement, the modifications effectively rotate in phase with the reflector without the need physically to rotate the compensating device itself.

The radiation beam can be a visible or invisible beam but is typically coherent and generated by a laser.

BRIEF DESCRIPTION OF THE DRAWINGS

An example of an image scanner incorporating radiation scanning apparatus according to the invention will now be described with reference to the accompanying drawings, in which.

DETAILED DESCRIPTION OF THE EMBODIMENT

Figure 1:
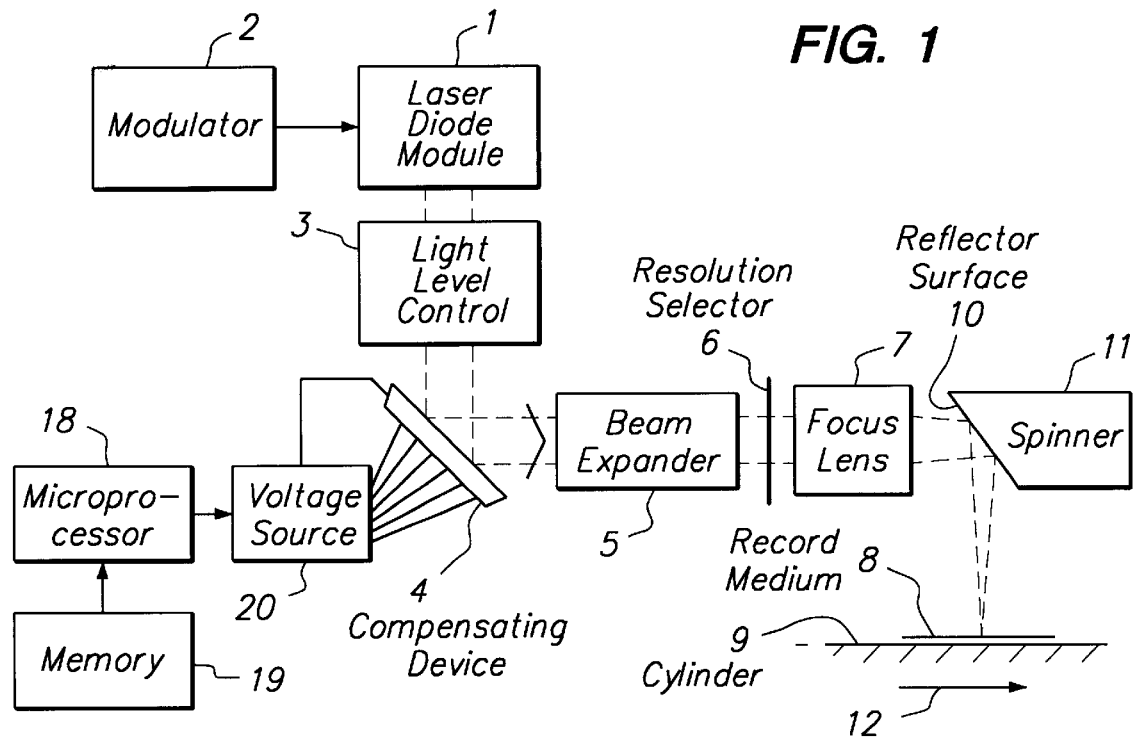
FIG. 1 is a block diagram of the apparatus.

The image scanning apparatus shown in FIG. 1 comprises a laser diode 1 connected to a modulating device 2. The modulating device 2 comprises a microprocessor and image store containing data defining the appearance of an image to be recorded. The microprocessor accesses the image data in sequence and generates a corresponding laser diode modulation control signal which is used to modulate the output beam from the laser diode 1. The output beam passes through a light level control element 3 and is reflected by a compensating device 4 to be described in more detail. The light level control element typically comprises a pair of overlapped neutral density wedges which are movable towards and away from each other in the path of the output beam. The reflected beam passes through a beam expander 5 and a resolution selector 6, such as an aperture plate, iris, or zoom lens, and is then focused by a lens 7 onto a record medium 8 carried on the internal surface of a cylinder 9. The beam is reflected onto the record medium 8 by a reflecting surface 10 of a rotatably mounted spinner 11. The mounting arrangement of the spinner is not shown in FIG. 1. It will be noted that the components 4–7 and 11 are all mounted coaxially. As the spinner rotates about its axis, the focused beam scans across the record medium 8 in a direction orthogonal to the plane of the diagram while at the same time it traverses in a direction 12 at a relatively slow rate compared with the scanning rate of the beam so that the record medium 8 is scanned in a raster fashion.

Figure 2:
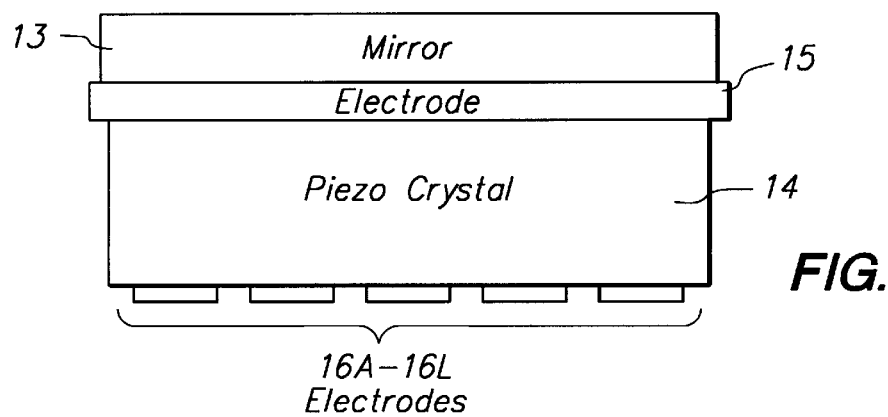
FIG. 2 illustrates the compensating device of FIG. 1 in more detail.
Figure 3:
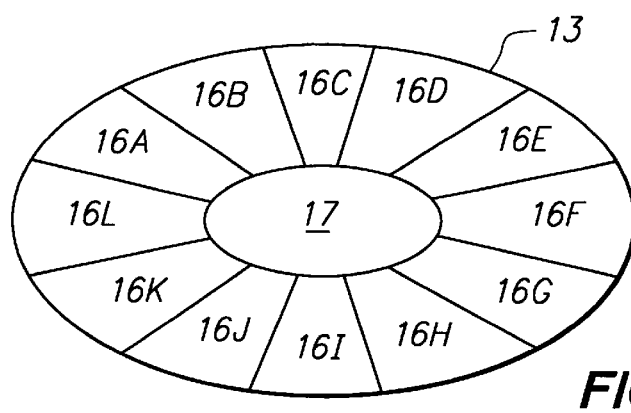
FIG. 3 is an underneath plan of the compensation device.

As explained above, the rotational movement of the spinner 11 causes abberations or distortions in the wavefronts reflected by the spinner which is undesirable. The compensating device 4 is provided to compensate for these distortions. The device 4 is shown in more detail in FIGS. 2 and 3 and comprises a plane mirror 13 mounted on a piezo-electric crystal 14 with an electrode 15 sandwiched between them. On the underside of the crystal 14 is an array of twelve electrodes 16A–16L spaced circumferentially around the crystal 14 as shown in FIG. 3. A central region 17 has no electrode. Each electrode has dimensions of the order 1–4 mm with a beam diameter of 10 mm.

The dimensions of the electrode array 16A–16L are such as to correspond generally with the dimensions of the incident beam on the compensating device 4.

Each of the electrodes 15,16 is connected to a controllable voltage source 20 which is controlled by a microprocessor 18 connected to a memory 19. The source 20 applies a constant potential to the electrode 15 and is controlled to vary the potential applied to individual ones of the electrodes 16A–16L. The application of a potential across a portion of the crystal 14 will cause the piezo-electric element to distort by an amount corresponding to the size of the potential and this in turn will deform the aligned portion of the mirror 13, thus causing a distortion in that portion of the wavefront of the incident radiation beam which impinges on that portion of the mirror.

The memory 19 is preloaded with data defining the manner in which the different portions of the mirror 13 should be distorted during rotation of the spinner 11 and this information is extracted by the microprocessor 18 to cause those distortions. Since the spinner 11 rotates, the distortion applied to a particular part of the wavefront should rotate with the spinner and this is achieved by "rotating" the modifications of the different portions of the surface of the mirror 13 in phase and this in turn is caused by varying the voltages applied to the electrodes 16A–16L in a sequential manner. The typical speed of the spinner 11 is 500 Hz which is well within the response time of a piezo crystal.

In addition to introducing a distortion to compensate for rotation of the spinner 11, the microprocessor 18 could also distort the mirror 13 to compensate for other abberations in the apparatus, for example static abberations. This would allow wider tolerance specifications. Furthermore, distortions could be introduced to operate in conjunction with the focus lens 7 to compensate for thermal effects on astigmatism on the laser diode 1.

The data preloaded into the memory 19 can be determined in a variety of ways. The errors could be measured using an interferometer, empirically or by theoretical calculation.

I claim:

1. A method of scanning a radiation beam in which the beam impinges on a rotating reflector to cause the scanning movement, the method comprising modifying the optical path of circumferentially spaced portions of said beam upstream of said reflector, in phase with rotation of said reflector so as to compensate for distortions in the reflected beam introduced by said reflector.

2. A method according to claim 1, wherein said modifying step comprises individually reflecting the circumferentially spaced portions of the beam.

3. Radiation beam scanning apparatus comprising a rotatable reflector for causing an incident radiation beam to undergo a scanning movement; and a compensating device on to which the radiation beam impinges before reaching said rotating reflector, said compensating device modifying the optical path of circumferentially spaced portions of the beam upstream of said reflector, in phase with the rotation of said reflector, so as to compensate for distortions in the reflected beam introduced by said reflector.

4. Apparatus according to claim 3, wherein said compensating device comprises an array of reflectors onto respective ones of which the circumferentially spaced portions of the beam impinge.

5. Apparatus according to claim 4, wherein said compensating device comprises an array of control elements for distorting corresponding reflectors.

6. Apparatus according to claim 5, wherein said control elements are provided by one or more piezo-electric devices.

7. Apparatus according to claim 4, wherein said array of reflectors is defined by different portions of a single, continuous reflector.

8. Apparatus according to claim 3, wherein said compensating device is rotationally static and further comprises a controller for controlling individual optical elements of said compensating device so as to cause the modifications imparted by the optical elements to rotate with the reflector.

* * * * *